April 11, 1961 G. F. QUAYLE 2,979,162
UPRIGHT ASSEMBLY FOR INDUSTRIAL TRUCKS
Filed Jan. 28, 1957 3 Sheets-Sheet 1
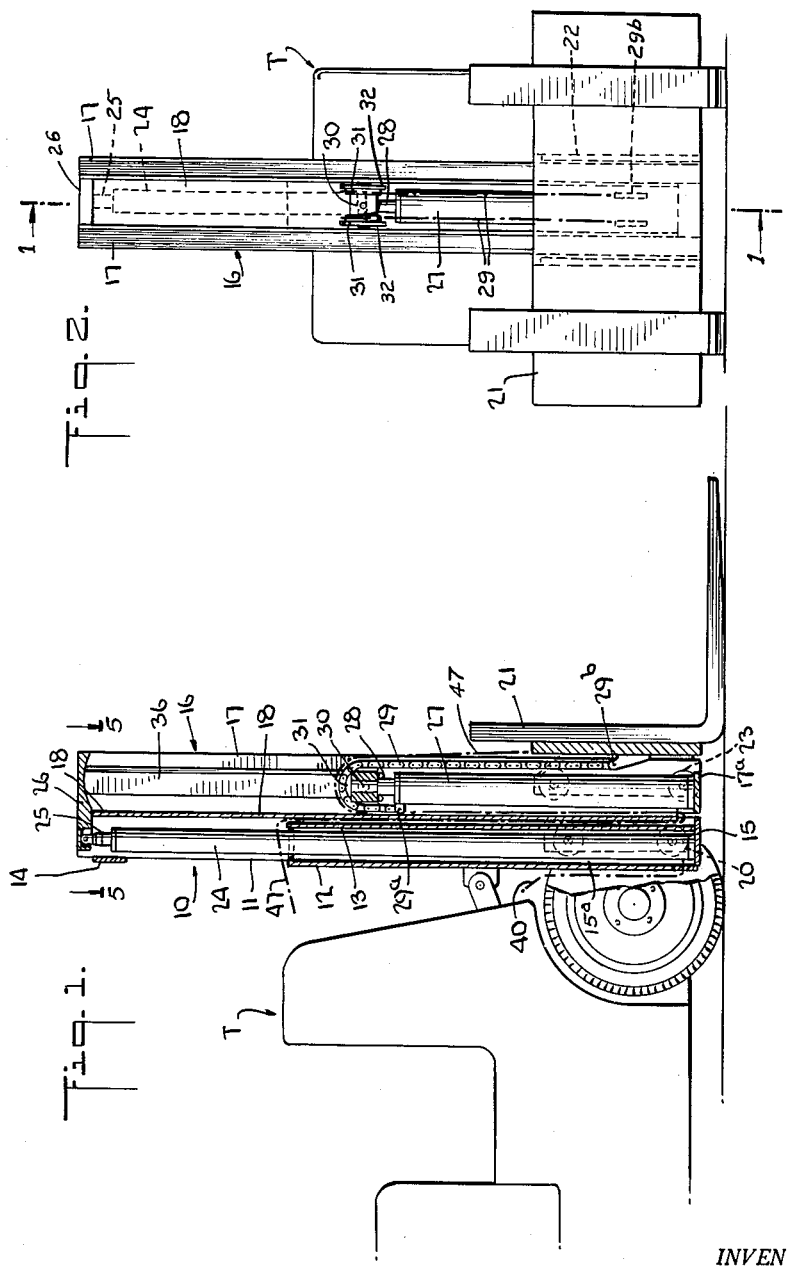
INVENTOR.
GEORGE F. QUAYLE
BY
A. H. Golden
ATTORNEY

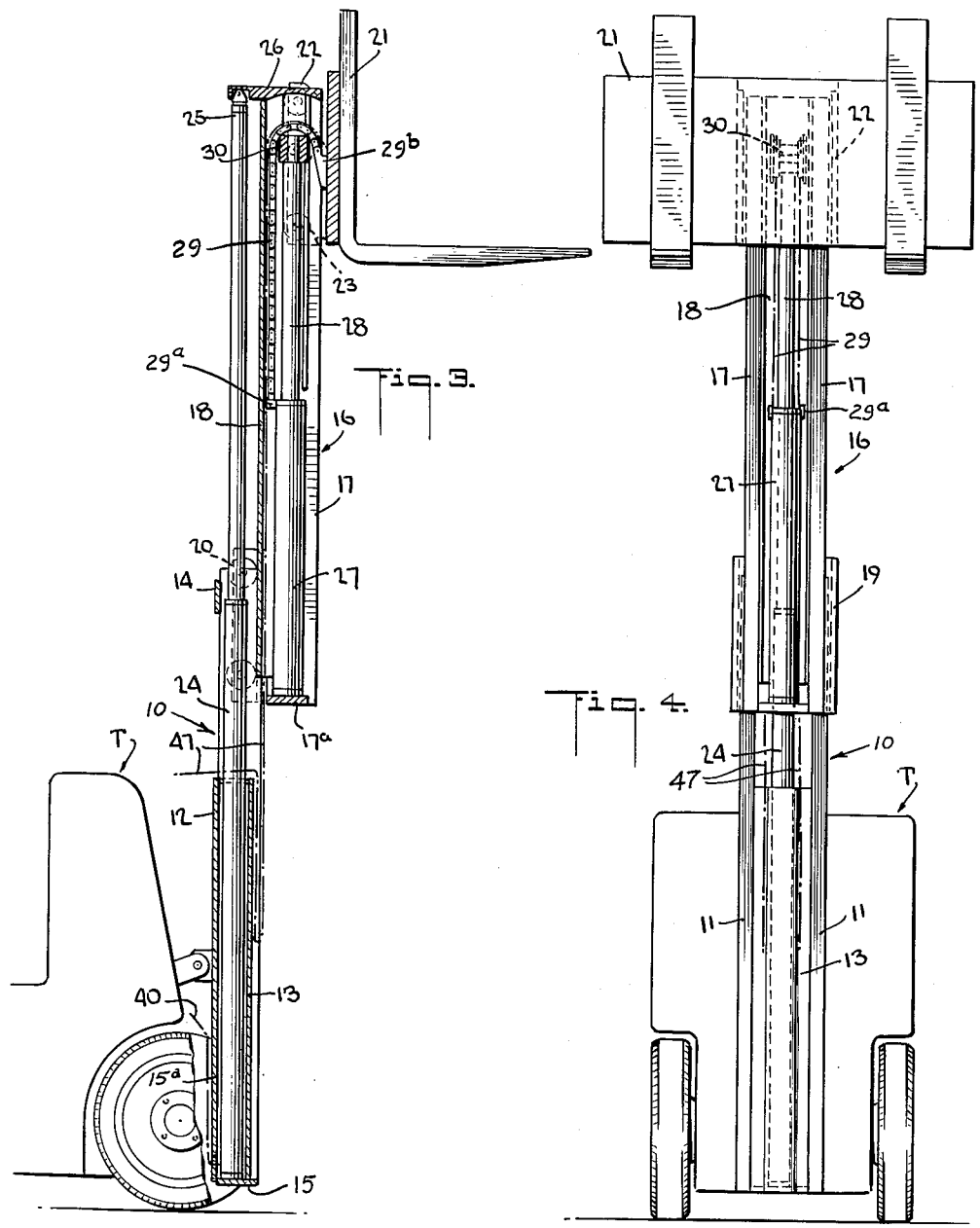

April 11, 1961 G. F. QUAYLE 2,979,162
UPRIGHT ASSEMBLY FOR INDUSTRIAL TRUCKS
Filed Jan. 28, 1957 3 Sheets-Sheet 3
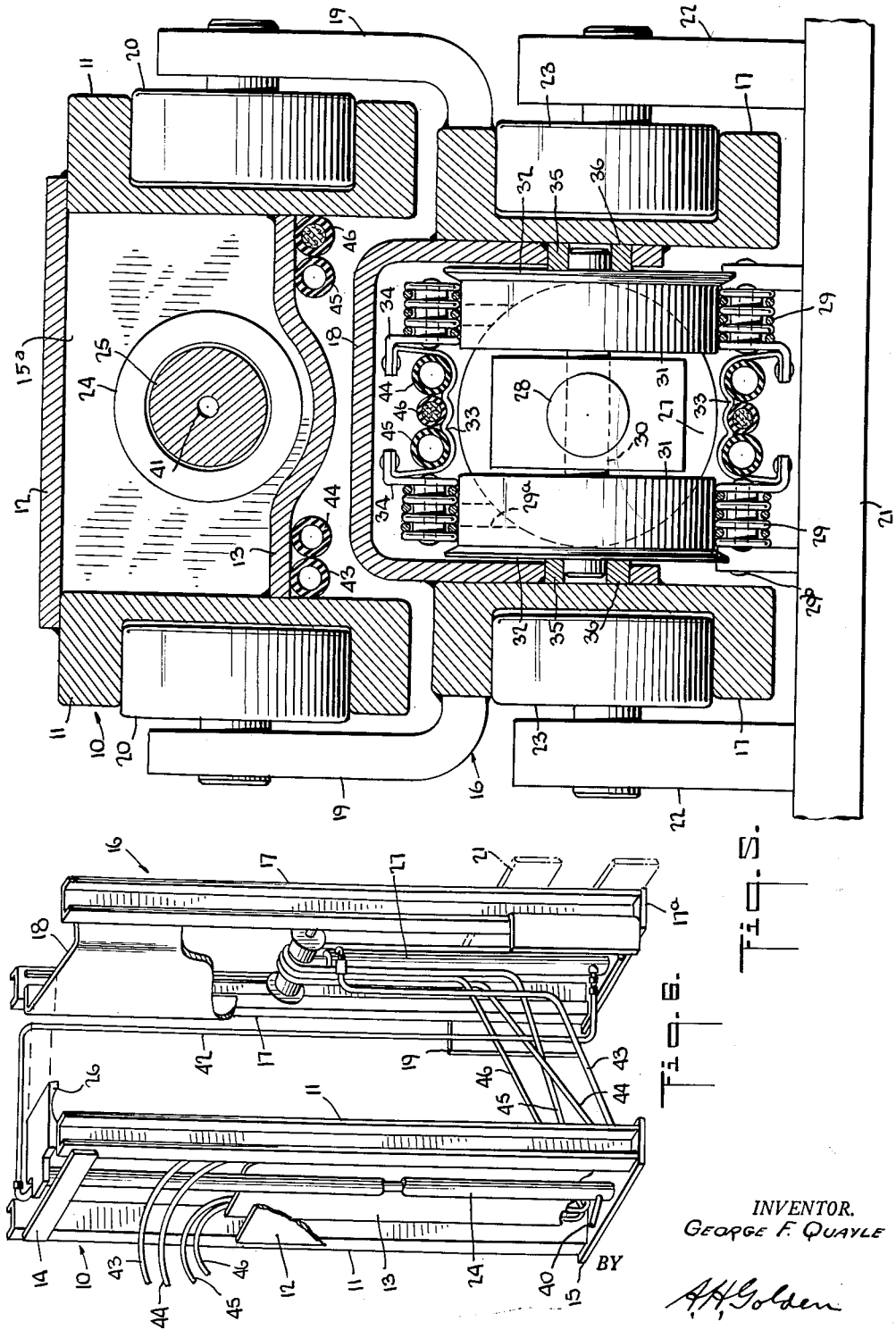
INVENTOR.
GEORGE F. QUAYLE
BY
A. H. Golden
ATTORNEY

2,979,162
UPRIGHT ASSEMBLY FOR INDUSTRIAL TRUCKS

George F. Quayle, Philadelphia, Pa., assignor to The Yale & Towne Manufacturing Company, Stamford, Conn., a corporation of Connecticut Filed Jan. 28, 1957, Ser. No. 636,733

7 Claims. (Cl. 187—9)

This invention relates to industrial trucks of the class having a load carriage that moves vertically on uprights whereby to lift a load.

It is customary in trucks of this class to utilize channel uprights that are mounted in spaced relation on the front of the truck, with a hydraulic ram mounted in the space between those uprights and arranged to act through chains to lift the load carriage slidably mounted on the uprights. In those trucks that are required to lift a load to a considerable height, the carriage moves on secondary uprights that are in turn slidably mounted on the primary uprights. In order to lift the carriage and uprights, it is necessary to equip the truck with at least one lift ram together with hoses for hydraulic fluid, as well as chains, sheaves, and guides, all of which are positioned in front of the truck driver and tend to obstruct his view when driving the truck or when manipulating the carriage relatively to a load.

The prior art has attempted so to arrange the load carriage mounting and operating means that the truck driver will have a better view in a forward direction, but those attempts have not been entirely successful because of the numerous problems that are involved in equipping the truck with the necessary features. Thus, the uprights that support the load carriage must be so constructed as to be rigid, so that they will not deflect to a large extent under a load. Not only must the uprights be rigid in a fore and aft direction, but the uprights must also have torsional rigidity. This, together with the fact that the various hoses, lift rams, and other parts must be mounted in a very narrow space, creates a very considerable problem that has not been successfully solved insofar as I am aware.

I have now conceived by my invention an exceedingly satisfactory construction that enables me to mount and to actuate a load lifting carriage through means that are very narrow, and that do not obstruct the view of the operator to any great extent. Through that novel construction, moreover, I am able to achieve full lifting of the load carriage on the secondary uprights without increasing the overall height of the truck. In addition, I am able while utilizing carriage mounting means or uprights that are very narrow, to arrange the lift rams, chains, hoses, and other operating parts within those uprights, so that those parts do not obstruct the operator's view and are protected from damage during the operation of the truck.

As a very important feature of my invention, the primary uprights are brought into close relationship and are joined by plates whereby to form a box in effect. Through that box construction, I am able to make the uprights very narrow, yet I achieve a very high degree of rigidity in the uprights. In addition, a lift ram may then be mounted within the box-like construction. That lift ram can be arranged to lift the load carriage, but in trucks that have secondary uprights, the ram will lift those uprights as well as the carriage, if full independent lifting of the carriage on the secondary uprights is not required.

I so arrange the channeled members that I prefer to use to form the box-like primary uprights, that the channeled portions face outwardly toward the opposed sides of the truck. The channels will then accept guide rollers on brackets that extend at the sides of the primary uprights to support the secondary uprights or the load carriage. When secondary uprights are utilized, those uprights will have channels that are in substantially aligned relation to the channels of the primary uprights in a longitudinal direction on the truck, those channels also facing outwardly toward the sides of the truck to accept rollers on the load carriage. The channels of the secondary uprights are secured to one another to form an integral assembly through a full length plate that is so arranged as to leave open a space between the secondary uprights.

As a particular feature of my invention, I am able to utilize for lifting the load carriage a lift ram that has a relatively large diameter and that occupies practically the entire space between the secondary uprights. My construction nevertheless leaves space at the forward and rearward sides of the ram in which I arrange load chains for the carriage. To enable the lift ram to actuate the load chains, I utilize a pair of load sheaves, each of which is formed with a flange on its outer side only. Since the inner sides of the sheaves do not have flanges, I can mount those sheaves relatively close to the axis of the ram. Moreover, the sheaves can move closer to the end of the ram cylinder when the ram is retracted. I then equip the load chains with spacers that will hold the chains in predetermined spaced relation so that the chains cannot slip from the inner edge of each sheave. I prefer also to mount the sheaves on the ram through a shaft that is in guide relation to the secondary uprights, whereby to hold the ram in aligned relation to those uprights.

As a further feature of my invention, I utilize the chain spacers to support hydraulic hoses or power lines through which power is applied to load manipulating devices on the load carriage. With the power lines supported through the spacers, those lines will move with the chains and can be arranged in an extremely small space between the secondary uprights.

As a further feature of the invention, my upright structure can function as a hydraulic reservoir, thereby eliminating the need for mounting the usual reservoir in the truck.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciated that the conception on which my disclosure is based may readily be utilized as a basis for the designing of other structures for carrying out the several purposes of my invention. It is important, therefore, that the claims be regarded as including such equivalent construction as do not depart from the spirit and scope of my invention, in order to prevent the appropriation of my invention by those skilled in the art.

In the drawings:

Fig. 1 is a vertical section showing my novel upright construction.

Fig. 2 is a front view showing my invention.

Figs. 3 and 4 are like Figs. 1 and 2 but show the load carriage and secondary uprights in elevated position.

Fig. 5 is a cross-section on the line 5—5 in Fig. 1,

Fig. 6 shows diagrammatically in semi-exploded relation, the arrangement of power lines and uprights of my invention.

Referring now more particularly to Fig. 1 of the drawings, my novel construction has as a part thereof a primary upright assembly that I indicate generally by the numeral 10. The particular means that support the primary assembly 10 are not important to an understanding of my invention, and it is merely necessary to know that the assembly is mounted at the front end of a truck T, preferably for pivotal movement, as is customary in the particular art.

As best seen in Figs. 2 and 5, the primary upright assembly has a pair of channel uprights 11 that are arranged with their channel portions facing in an outward direction. I join the channel uprights 11 to form an extremely novel box-like structure, utilizing for that purpose a vertical plate 12 that is welded to the rear surfaces of those uprights, together with a further vertical plate 13. For reasons that will appear as my description proceeds, I prefer to weld the plate 13 between the inner faces of the uprights 11 with that plate somewhat to the rear of the front edges of uprights 11. I prefer also to utilize between the primary uprights 11 upper and lower cross members 14 and 15. It is important to realize that the plates 12, 13 extend through a very substantial part of the length of channel uprights 11, Fig. 1, and act with those uprights to form an integral unit that has a very high degree of rigidity. Further, the plates 12, 13 are joined to the bottom cross member 15, thus forming between uprights 11 a chamber 15a that I can utilize as a fluid reservoir for the hydraulic system of the truck.

Referring again to Figs. 1, 2 and 5, my novel construction has also a secondary upright assembly 16 that includes a pair of secondary channel uprights 17. Those secondary uprights 17 are arranged in substantially aligned relation to the primary uprights 11 and, like those uprights, have their channel portions facing in an outward direction. I assemble the secondary channel uprights 17 in integral relation to one another through a vertical plate 18 that extends practically the full length of uprights 17, as will be appreciated from Fig. 1. The plate 18 is U-shaped, as best seen in Figs. 5 and 6, and has opposed sides that are welded to the inner faces of channel uprights 17. The arrangement is such that plate 18 is rather closely juxtaposed to the plate 13 on the primary uprights 11, and leaves open a considerable space between secondary uprights 17. As shown in Figs. 1 and 3, I equip secondary uprights 17 with a bottom cross member 17a, and also with a rearwardly extending top bracket 26 to which I shall refer again.

I mount the secondary channel uprights 17 through brackets 19, best shown in Fig. 5, that are welded to those uprights 17 in position to extend rearwardly at the sides of primary uprights 11, the brackets 19 being equipped with rollers 20 that ride in the primary channels. Similarly, I mount a load carriage 21 on the secondary uprights 17 through brackets 22 that extend rearwardly and that are equipped with rollers 23 riding in the channels of those uprights 17. In that arrangement, the brackets 22 on load carriage 21 are in aligned relation to the brackets 19 on the secondary uprights.

It is important to realize that the novel construction I have thus far described will be extremely rigid and will not deflect to any great extent due to a load on the load carriage 21. Further, that construction will be rigid when accepting torsional forces. Moreover, I can achieve this rigid construction when actually arranging the primary channel uprights 11 in close relationship to one another, with the secondary uprights 17 correspondingly close to one another. Therefore, I am able through my novel inventive concept to contribute an upright assembly that is very narrow, and that enables the truck driver to have a better view when driving the truck or when manipulating a load.

I shall now call attention to the fact that the box-like construction of the primary upright assembly 10 enables me to mount within that assembly a lift ram cylinder 24, Figs. 1, 3 and 5, that cylinder actually being arranged in the fluid reservoir 15a. A piston 25 moves in cylinder 24 and acts against the bracket 26 on the upper end of the secondary upright assembly 16, so that fluid pressure when applied to ram cylinder 24 will lift the secondary uprights relatively to the truck.

In addition, I can utilize the space between the secondary uprights 17 for a ram cylinder 27 and piston 28, Figs. 1, 3 and 5, that will lift the load carriage 21 relatively to those uprights. In order that this part of my invention may best be understood, I shall state first that the piston 28 acts in a rather usual way through load chains 29 that are secured at end points 29a, 29b to the cylinder 27 and carriage 21, as well shown in Fig. 1. Those skilled in the art will understand that the particular arrangement enables me to achieve full lifting of load carriage 21 on secondary uprights 17 without upward movement of those uprights. In fact, it is possible through my novel construction to lift the carriage and secondary uprights with a sequential action like that described in the patent to Ulinski, No. 2,554,930. In my invention, however, I do this while utilizing extremely novel means between the ram piston 28 and load chains 29, as I shall now describe.

Thus, it will be seen when considering Fig. 5 that I utilize on the upper end of ram piston 28 a transverse shaft 30 having load sheaves or rollers 31 that rotate on its opposed ends. Each roller 31 is formed on its outer edge with a flange 32, but is formed without a flange at its inner edge. Because the inner edges of rollers 31 do not have flanges, I can arrange these rollers to move close to the upper end of ram cylinder 27, with parts of the outer flanges 32 positioned at the sides of the cylinder. It is then possible for the piston 28 to have a longer effective stroke. Further, I can place the rollers 31 very close to the axis of ram cylinder 27, with the load chains 29 reeved over the rollers in correspondingly close relationship to the piston 28. The roller flanges 32 naturally will prevent the load chains 29 from shifting outwardly on the rollers 31. To hold the chains 29 against shifting inwardly, I utilize between those chains a series of clips 33, Fig. 5, that are attached to bracket portions 34 on the chain links.

The shaft 30, upon which the chain rollers 31 rotate, has end portions that are juxtaposed to the inner sides of secondary channel members 17 as shown in Fig. 5. I equip those end portions of shaft 30 with bearing blocks 35 that are adapted to slide vertically in bearing ways 36 on channel members 17. Through that arrangement, the upper end of ram piston 28 will be guided relatively to secondary channel uprights 17. Further, the guide relation that I thus establish between roller shaft 30 and uprights 17 will hold the chain rollers 31 in properly aligned positions transverse to the uprights.

It is exceedingly important to realize that the chains in the construction I have described do not require space at the sides of the lift ram cylinder 27. Thus, as will best be appreciated from Fig. 5, I am able to mount the chain rollers 31 above ram cylinder 27, with lower portions of the rollers 31 in opposed relation to the top of the cylinder. The load chains 29 will then be arranged vertically at the forward and rearward sides of ram cylinder 27, as well shown in Fig. 5, the plate 18 by its U-shaped leaving a space for these chains at the rear side of the cylinder. Further, since the inner edges of the rollers 31 do not have flanges, it is possible to arrange those rollers to move extremely close to the upper end of ram cylinder 27, so that the piston 28 can then have a longer effective stroke. Because rollers 31 and chains 29 do not require space at the sides of the ram cylinder 27, I am able to mount the rollers, chains, and ram in a very narrow space between the secondary uprights 17.

Stated in other words, I am able to arrange between the secondary uprights 17 a ram cylinder 27 that is large and that utilizes practically all of the space between the uprights. These things I do while achieving full independent lifting of the load carriage 21 relatively to the secondary uprights 17, as in the Ulinski patent to which I have already referred.

I shall now refer to Fig. 6 of the drawings to describe the arrangement of the power lines that I utilize in my invention. To apply power to the ram cylinder 24 on the primary upright assembly 10, I utilize simply a hydraulic line 40 that extends from a source of power on the truck to the lower end of ram cylinder 24. Since that cylinder will have little if any movement relatively to the truck, no particular problem is involved in arranging the line 40. To apply power to the ram cylinder 27 on the secondary upright assembly, I construct the piston 25 with a channel 41, Fig. 5, and I utilize a hydraulic line 42 between the upper end of that channel 41 and the lower end of ram cylinder 27, Fig. 6. It will be appreciated that piston 25 moves with the secondary upright assembly 16 and ram cylinder 27 on that assembly, and therefore the hydraulic line 42 may very well be a rigid tube.

Further, as shown in Figs. 5 and 6, I can arrange power lines 43, 44, 45, and 46 to extend between the truck T and the secondary upright assembly 16 and load carriage 21. In the interest of clarity, I indicate those power lines in Figs. 1 and 3 by a dot and dash line 47. Naturally, the lines 43, 44, 45, and 46 can be hoses or electric cables, as may be required. The lines 43, 44, 45, and 46 extend from the truck past the upper ends of the plates 12, 13, on primary upright assembly 10, and then downwardly in front of plate 13. Those lines then extend forwardly of the plate 18 on the secondary upright assembly and in an upward direction. In Fig. 6 I show the hydraulic line 43 connected to the upper end of ram cylinder 27 to act as a drain line for fluid that may seep past the piston 28 in that cylinder. The lines 44, 45 and 46 extend further into position between the load chains 29, as will be understood when considering Fig. 5, and then along those chains to the load carriage 21. I support the power lines 44, 45, 46 on chains 29 through the chain spacer clips 33 that I have already described. Naturally, the power lines 44, 45, 46 will then move with the chains as the load carriage 21 moves vertically, and will also move with secondary upright assembly 16 as it moves on the primary uprights.

It will be understood, therefore, that I am able to supply power for operating the lift rams 24, 27 as well as for an attachment that may be mounted on the load carriage 21, but with the hydraulic lines mounted actually within my upright construction and requiring extremely little space. Thus, while utilizing uprights that are extremely narrow, I am able nevertheless to arrange the power lines so that they will be protected against damage, and so that they will not extend outside the uprights to obstruct the vision of the truck driver.

I believe that those skilled in the art will now understand that I have contributed an extremely novel load lifting construction that has very considerable merit. Through my invention, it is possible to mount a load carriage through uprights that are very narrow, but that will nevertheless be exceedingly strong and rigid. Thus, I can achieve high lifting of the load carriage while utilizing uprights that do not obstruct the operator's view to any great extent. In fact, I can do this while achieving also full lifting of the load carriage independently of the secondary upright movement, as in the Ulinski patent. In addition, I am able to equip my uprights with power lines that are actually arranged within the uprights despite the fact that the uprights are very narrow. I believe, therefore, that the value of my invention will be fully appreciated.

I now claim:

1. An upright assembly for an industrial truck comprising a pair of channel uprights in spaced relation to one another, a pair of front and rear plates welded to and extending vertically on both uprights to form with said uprights a vertical box-like structure, the channels of said uprights facing outwardly toward opposed sides of the truck, a member extending between said plates and uprights to close a lower portion of the box-like structure whereby to form with the plates and uprights a fluid reservoir for the truck, a lifting member, means engaged in the channels of said uprights to mount said lifting member on said uprights for vertical movement, a hydraulic ram arranged vertically in the space between said uprights and supported relatively to said uprights, and means extending from said ram past said front plate on the uprights whereby the ram when actuated lifts the lifting member relatively to said uprights.

2. An upright assembly for an industrial truck comprising, a pair of primary channel uprights mounted on the main frame of the truck in proximate relationship relatively to the relationship of uprights in conventional assemblies to improve operator visibility, the channels of said uprights facing outwardly toward opposed sides of the truck, a pair of front and rear cross members extending vertically along said proximately related uprights and welded thereto, a horizontal cross member welded to the bottom of said front and rear cross members and said uprights and cooperating therewith to form a fluid reservoir, a ram cylinder and piston supported relatively to said channel uprights in position between said uprights and front and rear cross members, a lifting member, means engaged in the outwardly facing channels of said primary uprights to mount said lifting member on said uprights, and means whereby said piston when extended lifts said lifting member.

3. An upright assembly for an industrial truck comprising, a pair of primary channel uprights mounted on the main frame of the truck in proximate relationship relatively to the relationship of uprights in conventional assemblies to improve operator visibility, the channels of said uprights facing outwardly toward opposed sides of the truck, a pair of front and rear cross members extending vertically along said proximately related uprights and welded thereto, a horizontal cross member welded to the bottom of said front and rear cross members and said uprights and cooperating therewith to form a fluid reservoir, a pair of channel secondary uprights secured to one another with their channels facing outwardly and spaced substantially as said primary uprights, means engaged in the outwardly facing channels of said primary uprights to mount said secondary uprights in longitudinal alignment with said primary uprights for vertical movement relatively thereto, a hydraulic ram supported relatively to said primary uprights in position between said primary uprights for lifting said secondary uprights, carriage means engaged with the channels of the secondary uprights for vertical movement relatively to said secondary uprights, and a hydraulic ram carried by said secondary uprights for lifting said carriage means.

4. An upright assembly for an industrial truck comprising, a pair of channeled primary uprights mounted on the main frame of the truck in proximate relationship relatively to the relationship of uprights in conventional assemblies to improve operator visibility, the channels of said uprights facing outwardly toward opposed sides of the truck, a pair of front and rear cross members extending vertically along said proximately related uprights for a major part of their length and welded thereto, a horizontal cross member welded to the bottom of said uprights and cooperating with said uprights and front and rear cross members to form a rigid open topped box-like structure, a pair of secondary channeled uprights spaced substantially as said primary uprights, a vertical plate welded to said secondary uprights and extending along the rear sides of those uprights for a major part of their length whereby to form with the secondary uprights a rigid unitary structure, means engaged in the outwardly facing channels of said primary uprights to mount said secondary uprights in longitudinal alignment with said primary uprights for vertical movement relatively thereto, a hydraulic ram between said primary uprights and extending above said box-like structure for lifting said secondary uprights, carriage means mounted for vertical movement along the channels of said secondary uprights, and a hydraulic ram between said secondary uprights and forwardly of the vertical plate thereon for lifting said carriage means.

5. An upright assembly for an industrial truck comprising, a pair of channeled primary uprights mounted on the main frame of the truck in proximate relationship relatively to the relationhsip of uprights in conventional assemblies to improve operator visibility, the channels of said uprights facing outwardly toward opposed sides of the truck, a pair of front and rear cross members extending vertically along said proximately related uprights for a major part of their length and welded thereto, said front cross member being set somewhat inwardly to leave open a longitudinal space between forward portions of said primary uprights, a horizontal cross member welded to the bottom of said primary uprights and cooperating with said uprights and front and rear cross members to form a rigid open topped box-like structure, a pair of secondary channeled uprights spaced substantially as said primary uprights, a vertical plate welded to said secondary uprights and extending along those uprights for a major part of their length whereby to form with the secondary uprights a rigid unitary structure, a medial vertical portion of said plate offset to extend into the longitudinal space between forward portions of the primary uprights so as to leave available for lifting mechanism a relatively large space between the secondary uprights, means engaged in the outwardly facing channels of said primary uprights to mount said secondary uprights in longitudinal alignment with said primary uprights for vertical movement relatively thereto, a hydraulic ram between said primary uprights and extending above said box-like structure for lifting said secondary uprights, carriage means mounted for vertical movement along the channels of said secondary uprights, and lifting mechanism in said space between said secondary uprights for lifting said carriage means.

6. An upright assembly for an industrial truck comprising, a pair of channeled primary uprights mounted on the main frame of the truck in proximate relationship relatively to the relationship of uprights in conventional assemblies to improve operator visibility, the channels of said uprights facing outwardly toward opposed sides of the truck, cross members welded to said proximately related uprights and cooperating therewith to form a rigid unitary structure, said cross members being positioned rearwardly from forward portions of said primary uprights to leave open a longitudinal space between those portions, a pair of secondary channeled uprights spaced substantially as said primary uprights, a vertical plate welded to said secondary uprights and extending along those uprights for a major part of their length whereby to form with the secondary uprights a rigid unitary structure, a medial vertical portion of said plate offset to extend into the longitudinal space between the forward portions of the primary uprights so as to leave available for lifting mechanism a relatively large space between the secondary uprights, means engaged in the outwardly facing channels of said primary uprights to mount said secondary uprights in longitudinal alignment with said primary uprights for vertical movement relatively thereto, a hydraulic ram between said primary uprights for lifting said secondary uprights, carriage means mounted for vertical movement along the channels of said secondary uprights, and lifting mechanism in said space between said secondary uprights for lifting said carriage means.

7. In an industrial truck of the class described, a pair of spaced primary uprights mounted in proximate relationship relatively to the relationship of uprights in conventional assemblies, a pair of channel secondary uprights supported on the primary uprights for vertical movement, the channels of said secondary uprights facing outwardly toward opposed sides of the truck, a plate extending vertically on said secondary uprights for substantially their full length, side portions of said plate welded to the inner sides of the secondary uprights to form with those uprights a unitary rigid structure in which said secondary uprights are spaced substantially as are said primary uprights, said secondary uprights then being in proximate relationship as are the primary uprights whereby to improve operator visibility, a medial vertical portion of said plate on the secondary uprights offset to extend into the space between the primary uprights whereby to leave available for lifting mechanism a relatively large longitudinal space between the secondary uprights, a load carriage engaged with the channels of the secondary uprights to support the carriage for lifting movement on the secondary uprights, lifting mechanism including a ram assembly carried between the secondary uprights within the longitudinal space between those uprights, a pair of load chains through which the ram assembly lifts the carriage, a pair of chain actuating rollers on said ram assembly, and means mounting said rollers in positions overlying portions of the ram assembly to enable the load chains to extend at the front and rear sides of said assembly in said space between the secondary uprights.

References Cited in the file of this patent

UNITED STATES PATENTS

| | | |
|---|---|---|
| 1,954,345 | Burrows | Apr. 10, 1934 |
| 2,261,930 | Abbe | Nov. 11, 1941 |
| 2,393,405 | Page | Jan. 22, 1946 |
| 2,432,411 | Guerin et al. | Dec. 9, 1947 |
| 2,496,399 | Lesser | Feb. 7, 1950 |
| 2,513,928 | Frischmann | July 4, 1950 |
| 2,528,401 | Ulinski | Oct. 31, 1950 |
| 2,785,817 | Pappathatos | Mar. 19, 1957 |
| 2,791,293 | Schenkelberger | May 7, 1957 |

FOREIGN PATENTS

| | | |
|---|---|---|
| 742,767 | Great Britain | Jan. 4, 1956 |
| 1,068,862 | France | Feb. 10, 1954 |